United States Patent [19]

Inouye et al.

[11] 4,103,907
[45] Aug. 1, 1978

[54] MECHANICAL SEAL

[75] Inventors: Hiroshi Inouye, Ibaraki; Sadao Kobayashi, Takarazuka, both of Japan

[73] Assignees: Hitachi, Ltd.; Nippon Pillar Packing Co., Ltd., both of Japan

[21] Appl. No.: 693,314

[22] Filed: Jun. 7, 1976

[30] Foreign Application Priority Data

Jun. 9, 1975 [JP] Japan ................................. 50-68605

[51] Int. Cl.² ............................................. F16J 15/34
[52] U.S. Cl. ................................................. 277/96.1
[58] Field of Search ................. 277/22, 96.1, 96.2, 277/26, 96, 81

[56] References Cited

U.S. PATENT DOCUMENTS

| | | | |
|---|---|---|---|
| 2,494,887 | 1/1950 | Lenhart | 277/22 |
| 3,499,653 | 3/1970 | Garner | 277/96.1 |
| 3,738,667 | 6/1973 | Symons | 277/96.1 |
| 3,765,689 | 10/1973 | Adams | 277/26 |
| 3,804,424 | 4/1974 | Garner | 277/96.1 |
| 3,810,637 | 5/1974 | Bonuin | 277/96.2 |
| 3,875,793 | 4/1975 | Penny | 277/96.2 |
| 3,957,276 | 5/1976 | Wiese | 277/96.1 |

Primary Examiner—Robert I. Smith
Attorney, Agent, or Firm—Craig & Antonelli

[57] ABSTRACT

A mechanical seal comprising:
sealing elements forming a sliding seal surface for sealing action and made of material having a high heat conductivity;
surface deformation-generating grooves provided at the portion close to said sliding seal surface on the sealing elements so that a fluid film can be generated by the wedge action of surface deformations of said sliding seal surface; and
grooves for generating turbulence and increasing heat transfer area which are provided in the marginal portion, separately of the grooves for generating surface deformation, in said sealing elements so that cooling fluid fed to said sliding seal surface can be made turbulent and contact area of the cooling fluid can be increased.

23 Claims, 12 Drawing Figures

FIG.1
FIG.2
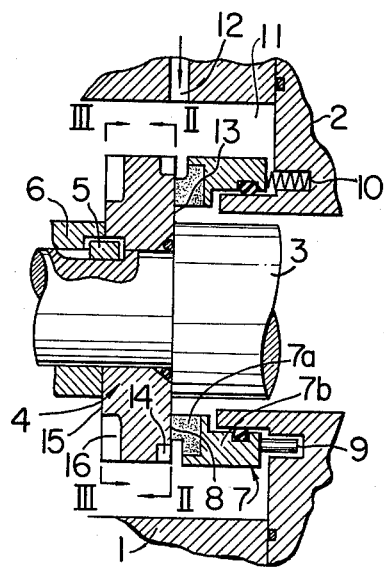
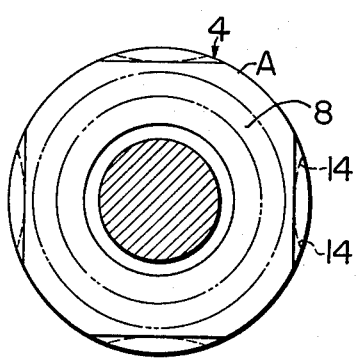
FIG.3
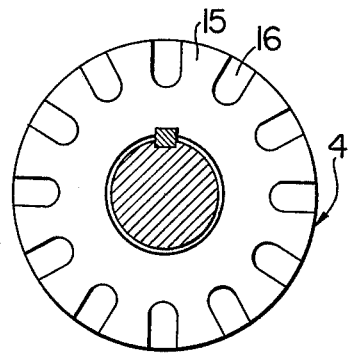

MECHANICAL SEAL

BACKGROUND OF THE INVENTION

1. FIELD OF THE INVENTION

This invention relates to a mechanical seal for use in a rotary machine for generally handling fluid under pressure such as a pump and a compressor.

2. DESCRIPTION OF THE PRIOR ART

In a machine for circulating fluid under pressure, a mechanical seal is used whereby leakage from a high pressure region to a low pressure region along a rotary shaft is prevented. Along with the advance in techniques, the machines using the mechanical seals of the type described are operated under the severe conditions such as high temperature, high pressure and high speed. Hence, recently, it is particularly required of a mechanical seal to display stable sealing performance even under said severe conditions such as high temperature, high pressure and high speed. With the purposes of maintaining the temperature of the mechanical seal within the suitable range and preventing impurities from accumulating in a shaft sealing portion to thereby meet the above requirements, such measures have been taken that flushing method for feeding fluid to or feeding to and discharging from the shaft sealing portion is improved, or grooves are provided in the sliding seal surface of the sealing elements whereby fluid is forcedly introduced into the sliding seal surface by utilizing the rotation of the sliding seal surface to thereby increase pressure of a fluid film of the sliding seal surface. However, even if said measures are taken, such problems cannot be obviated to the full extent that the volume of leakage is extremely increased, or rapid cooling or heat-generating is alternately repeated, thus creating heat cracks at the sliding seal surface, and further the sliding seal surface becomes rough due to high temperature, thus resulting in unduly high wear and unduly leakage. Despite the circumstances described above, the requirements on sealing required of the sealing device have been becoming severer at a rapid rate at present.

SUMMARY OF THE INVENTION

One object of the present invention is to provide a mechanical seal in which heat generated by sliding at a sliding seal surface is removed efficiently and the sliding seal surface is satisfactorily lubricated.

Another object of the present invention is to provide a mechanical seal in which satisfactory sealing performance can be achieved even at such shaft sealing conditions that pressure of sealing fluid and sliding speed are high at the sliding seal surface.

In order to achieve the aforesaid objects, the mechanical seal according to the present invention is constructed such that:

a sliding seal surface is formed within a plane substantially perpendicular to the axis of a rotary shaft by a rotatable sealing element and a stationary sealing element;

either one or both of said rotatable sealing element and stationary sealing element are each made of a single substance of sintered hard alloy;

surface deformation-generating grooves are provided in the vicinity of the sliding seal surface at the end face on the side of sliding seal surface of the sealing elements each made of said single substance of sintered hard alloy for giving surface deformation to said sliding seal surface through being brought into contact with cooling fluid; and turbulence-generating and heat-transfer area increasing grooves are provided at the marginal portion or portions of said sealing elements excluding the end face on the side of the sliding seal surface for making the cooling fluid turbulent and increasing heat transfer area.

Other objects, features and advantages of the invention described above will become more apparent from the following detailed description when taken in conjunction with the accompanying drawings.

BRIEF DESCRIPTION OF THE DRAWINGS

FIG. 1 is a longitudinal cross-sectional view showing a first embodiment of mechanical seal according to the present invention;

FIG. 2 is a cross-sectional view taken along the line II—II in FIG. 1;

FIG. 3 is a cross-sectional view taken along the line III—III in FIG. 1;

DESCRIPTION OF THE PREFERRED EMBODIMENT

Figure 4:
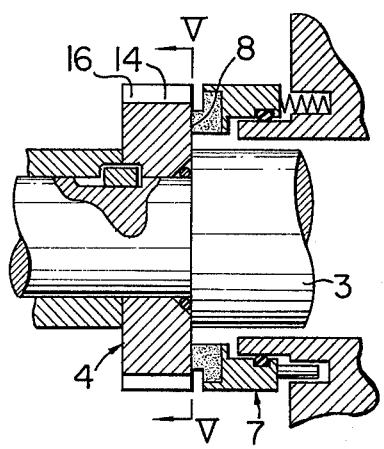
FIG. 4 is a longitudinal cross-sectional view of a second embodiment of mechanical seal according to the present invention.

FIG. 1 to FIG. 3 show the first embodiment of mechanical seal according to the present invention. In the drawings, so-called static type mechanical seal is shown, in which one of sealing elements and a spring are provided on the stationary side. In the drawing, designated at 1 is a casing, 2 a flange, 3 a rotary shaft, 4 a rotatable sealing element to be rotated along with the rotary shaft 3, and said rotatable sealing element 4 is solidly secured to the rotary shaft 3 by means of a key pin 5 and a shaft sleeve 6. Said rotatable sealing element 4 is made of a sintered hard alloy which is an excellent wear resistant material and has a high heat conductivity. Designated at 7 is a stationary sealing element which is kept stationary. Said stationary sealing element 7 comprises a stationary slide portion 7a joined with the rotatable sealing element 4 to form a sliding seal surface 8 and a stationary slide portion retaining frame 7b which is installed with said stationary slide portion 7a by shrinkage fit or the like and unrotatably mounted on the flange 2 by means of a pin 9. Said stationary slide portion 7a is normally made of carbon or the like. Designated at 10 is a spring for pressing the stationary slide portion 7a of the stationary sealing element 7 to the rotatable sealing element 4, 11 a sealed chamber, 12 a cooling fluid feed port provided in the casing 1, and said cooling fluid feed port 12 feeds cooling fluid to the portion of sliding seal surface 8 to thereby remove heat generated by sliding at the sliding seal surface 8. Said first embodiment is of such an arrangement that: a plurality of arcuate surface deformation-generating grooves 14 are provided at the end face 13 on the sliding seal surface of the rotatable sealing element 4 made of a single substance of sintered hard alloy for giving surface deformation to the sliding seal surface 8 in such a manner that said grooves 14 are not brought into contact with the sliding seal surface 8 and extend in the direction perpendicular to the axis of the rotary shaft; and a plurality of 'U' letter shaped grooves 16 are provided at the end face 15 on the side opposite to the sliding seal surface of the rotatable sealing element 4 for making cooling fluid turbulent and increasing heat transfer area. The aforesaid rotatable sealing element 4 is adapted to increase the transfer of heat generated by sliding at the sliding seal surface 8, and the grooves 16 provided in the rotatable sealing element 4 for causing turbulence and increasing heat transfer area is adapted for making the cooling fluid turbulent to thereby cool the sealing elements. Furthermore, axial thermal expansion in the vicinity of the portion of grooves 14 of the sliding seal surface 8 of the rotatable sealing element 4 is made smaller than that at the sliding seal surface in the vicinity of the portion (shown by 'A') of rotatable sealing element 4 not having the surface deformation-generating grooves 14 through the action of the cooling fluid filled in the surface deformation-generating grooves 14, thereby causing slight periodical surface deformations at the sliding seal surface 8, and said grooves 14 may be formed into circular arcuate shape as shown by broken lines in FIG. 2.

Next, description will be given of action of the first embodiment of mechanical seal according to the present invention.

Under the conditions of high pressure and high speed sealing, heat is generated by sliding at the sliding seal surface 8 to thereby elevate temperatures of the rotatable sealing element 4 and the stationary sealing element 7. However, said rotatable sealing element 4 and stationary sealing element 7 are cooled effectively due to high heat conductivity of the rotatable sliding element 4 made of the single substance of sintered hard alloy and also by contact with the cooling fluid caused to be turbulent by the grooves 16 having an increased heat transfer area and turbulence-generating action. On the other hand, in the case that heat is generated by sliding at the sliding seal surface 8 due to the rotation of the aforesaid rotary shaft 3 at high speed, the rotatable sliding element 4 is subjected to thermal expansion. However, the portion of the rotatable sealing element 4 having the surface deformation-generating grooves 14 is subjected to thermal expansion less than that of the portion not having the grooves 14 because the former is cooled by the cooling fluid penetrating into said grooves 14. For this reason, slight periodical surface deformations are generated in the sliding seal surface 8 on the side of the rotatable sealing element 4. Then, the cooling fluid penetrated into the concave portions caused by said surface deformations in the sliding seal surface 8 to form a lubricant film of the cooling fluid in the sliding seal surface 8, said lubricant film cooling and lubricating the sliding seal surface 8. Thereafter, when the extent of surface deformation at the sliding seal surface 8 is increased and the conditions of lubrication and cooling become satisfactory, heat generated by sliding at the sliding seal surface 8 is reduced resulting in decrease in temperature and the extent of surface deformation in the sliding seal surface 8 is decreased by self-adjusting action.

Figure 5:
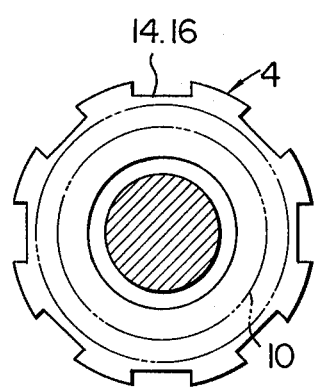
FIG. 5 is a cross-sectional view taken along the line V—V in FIG. 4.

FIG. 4 and FIG. 5 show the second embodiment of mechanical seal according to the present invention. In said second embodiment, a plurality of surface deformation-generating grooves 14 and also a plurality of turbulence-generating and heat transfer area increasing grooves 16, both of which have the cross-section identical to each other and being communicated with each other, are provided at the marginal portion of the rotatable sealing element 4 made of the single substance of sintered hard alloy in such a manner that said both grooves are not brought into contact with the sliding seal surface 8.

Figure 6:
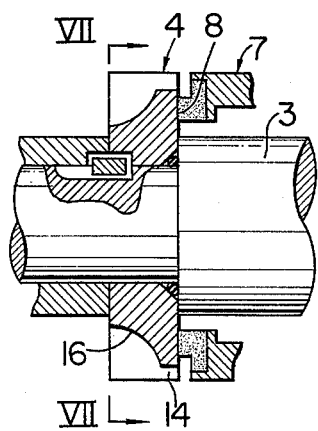
FIG. 6 is a longitudinal cross-sectional view of a third embodiment of mechanical seal according to the present invention.
Figure 7:
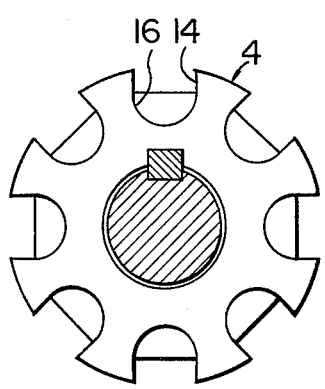
FIG. 7 is a cross-sectional view taken along the line VII—VII in FIG. 6.

FIG. 6 and FIG. 7 show the third embodiment of mechanical seal according to the present invention. In said third embodiment, a plurality of surface deformation-generating grooves 14 and also a plurality of turbulence-generating and heat transfer area increasing grooves 16, both of which have the peripheral cross-section identical to each other and being communicated with each other, with the grooves 16 having a greater radial dimension are provided at the marginal portion of the rotatable sealing element 4 made of the single substance of sintered hard alloy in such a manner that said surface deformation-generating grooves 14 are not brought into contact with the sliding seal surface 8.

Figure 8:
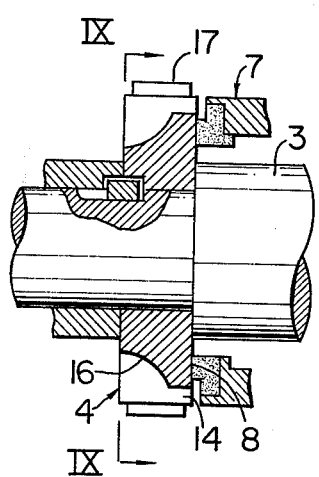
FIG. 8 is a longitudinal cross-sectional view of a fourth embodiment of mechanical seal according to the present invention.
Figure 9:
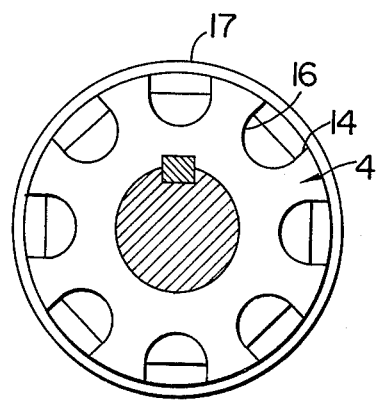
FIG. 9 is a cross-sectional view taken along the line IX—IX in FIG. 8.

FIG. 8 and FIG. 9 show the fourth embodiment of mechanical seal according to the present invention. The rotatable sealing element 4 may be destructed by the centrifugal force when rotated at high speed and there is such a danger that the resulting fragments are scattered, because the sintered hard alloy constituting the rotatable sealing element 4 is hard and brittle. In said fourth embodiment, therefore, a protective ring 17 for preventing the fragments from being scattered is coupled onto the outer periphery of the rotatable sealing element 4. Said protective ring 14 may be provided therein with both surface deformation-generating grooves and turbulence-generating and heat transfer area increasing grooves according to the present invention.

Figure 10:
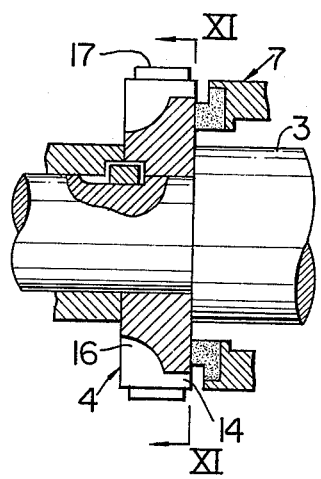
FIG. 10 is a longitudinal cross-sectional view of a fifth embodiment of mechanical seal according to the present invention.
Figure 11:
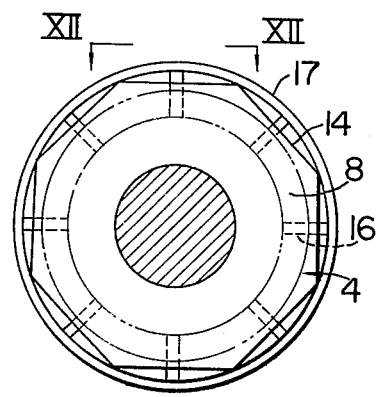
FIG. 11 is a cross-sectional view taken along the line XI—XI in FIG. 10.
Figure 12:
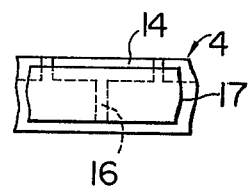
FIG. 12 is a cross-sectional view taken along the line XII—XII in FIG. 11.

FIG. 10 to FIG. 12 show the fifth embodiment of mechanical seal according to the present invention. In said fifth embodiment, the surface deformation-generating grooves 14 each formed into arcuate shape are provided at regular intervals in the vicinity of the sliding seal surface on the side of the sliding seal surface 8 of the rotatable sealing element 4. Additionally, the turbulence-generating and heat transfer area increasing grooves 16 are provided at regular intervals at the marginal portion of the rotatable sealing element 4 separately of said surface deformation-generating grooves 14 with said grooves 16 being communicated with the surface deformation-generating grooves 14. Said rotatable sealing element 4 is made of a single substance of sintered hard alloy having a high heat conductivity and coupled on the outer periphery thereof with a protective ring 17 for preventing the fragments from being scattered.

In the embodiments described above, the sliding seal surface 8 can be fully cooled and lubricated even under the conditions of high pressure and high speed sealing in the same manner as in the aforesaid first embodiment. Additionally, the configurations of the surface deformation-generating grooves 14 and the turbulence-generating and heat transfer area increasing groove 16 in the aforesaid embodiments are not necessarily limited to the examples shown in the drawings.

Further, in the aforesaid embodiments, the rotatable sealing element is made of a single substance of sintered hard alloy and provided therein with the surface deformation-generating grooves and the heat transfer area increasing grooves. However, only stationary sealing element or both rotatable sealing element and stationary sealing element may be made of a single substance of sintered hard alloy, respectively, and provided therein with the surface deformation-generating grooves and the turbulence-generating and heat transfer area increasing grooves. Additionally, the present invention is applicable to so-called rotary type mechanical seal wherein one of sealing elements and a spring are provided on the rotary member.

As the results of the tests according to the present invention, sealing performance and wear resistance performance were maintained to the full extent even under the shaft sealing condition of water pump at PV value of 1000 kg/cm$^3$ · m/s which had been inapplicable to the conventional mechanical seals.

As has been described in detail as above, according to the present invention, the sealing element or elements are each made of a single substance of sintered hard alloy and the flow of cooling fluid in the vicinity of the sliding seal surface is made good, thereby enabling to satisfactorily remove heat generated at the sliding seal surface. Furthermore, a lubricant film is formed by slight periodical surface deformations generated at the sliding seal surface due to the difference in thermal expansion, thus enabling to cool and lubricate the sliding seal surface in cooperation with the aforesaid heat transfer action. As the result, satisfactory shaft sealing performance is attainable without causing heat cracks at the sliding seal surface and unduly high wear and unduly leakage due to roughness of the slidable sealing surface even under the shaft sealing condition at a high PV value where sealing pressure and sliding speed are high.

What is claimed is:

1. A mechanical seal suitable for shaft sealing under the conditions of high pressure, high temperature and high speed, comprising:
   a shaft;
   a rotatable sealing element mounted on a shaft and rotated along with said shaft;
   a stationary sealing element forming a sliding seal surface where sealing action is performed in cooperation with said rotatable sealing element;
   spring means provided in the axial direction to increase the surface pressure of said sliding seal surface;
   a plurality of surface deformation generating groove means for generating surface deformations at the sliding seal surface with thermal expansion to thereby create a film of cooling fluid therein, said surface deformation generating groove means extending radially and being spaced apart in the circumferential direction in portions close to but not in contact with the sliding seal surface on the side of the sliding seal surface of at least one of the sealing elements.

2. A mechanical seal as set forth in claim 1, wherein at least one of said sealing elements is made of a single substance of sintered hard alloy to satisfactorily conduct the heat generated by sliding.

3. A mechanical seal as set forth in claim 1, wherein both of said sealing elements are made of a single substance of sintered hard alloy to satisfactorily conduct the heat generated by sliding.

4. A mechanical seal as set forth in claim 1, wherein said surface deformation generating groove means are provided on both said stationary sealing element and said rotatable sealing element.

5. A mechanical seal as set forth in claim 4, wherein at least one of said sealing elements is made of a single substance of sintered hard alloy to satisfactorily conduct the heat generated by sliding.

6. A mechanical seal as set forth in claim 4, wherein both of said sealing elements are made of a single substance of sintered hard alloy to satisfactorily conduct the heat generated by sliding.

7. A mechanical seal structure for use at high pressures, high temperatures, and high speeds, comprising:
   a rotating sealing element and a stationary sealing element being mounted to form a sliding sealing surface therebetween,
   a plurality of first groove means formed in at least one of said sealing elements adjacent to but not in contact with said sealing surface, said first groove means generating surface deformations in said sealing surface with thermal expansion to form a film of cooling fluid in said sealing surface, and
   a plurality of second groove means formed in a separate portion of said at least one of said sealing elements than said first groove means, said second groove means creating turbulence for and increasing contact area of said cooling fluid introduced at said sealing surface.

8. A mechanical seal structure according to claim 7, wherein said first and second groove means are each formed in both of said sealing elements.

9. A mechanical seal structure according to claim 7, wherein said sealing elements are annular members having respective major annular surfaces, said sliding sealing surface being formed between facing major annular surfaces of said sealing elements, and wherein said first and second groove means are formed in one of said sealing elements.

10. A mechanical seal structure according to claim 9, wherein said first groove means are arcuate grooves formed about the peripheral edge of said major annular surface of said one sealing element at which said sliding sealing surface is formed, and wherein said second groove means have a U-shaped cross-section extending radially at said major annular surface of said one sealing element facing away from said sliding sealing surface.

11. A mechanical seal structure according to claim 10, wherein said arcuate grooves have a circular cross-section.

12. A mechanical seal structure according to claim 10, wherein said first and second groove means are respectively in communication with each other.

13. A mechanical seal structure according to claim 12, wherein said first groove means have a circumferential dimension substantially identical with that of said second groove means.

14. A mechanical seal structure according to claim 10, wherein said first groove means have a circumferential dimension substantially identical with that of said second groove means.

15. A mechanical seal structure according to claim 9, wherein said first and second groove means have substantially the same cross-section, and are respectively in communication with each other.

16. A mechanical seal structure according to claim 9, wherein said first and second groove means are formed in said rotating sealing element, further comprising a protective ring coupled onto the outer periphery of said rotating sealing element.

17. A mechanical seal as set forth in claim 1, further comprising turbulence-generating and heat transfer area increasing grooves for causing said cooling fluid fed to the sliding seal surface to have a turbulent state and for increasing the contact area of said cooling fluid, each of said turbulence-generating and heat transfer area increasing grooves being provided with a cross-sectional shape different from that of the surface deformation generating groove means, and being in communication with respective ones of said surface deformation generating groove means, said turbulence-generating and heat transfer area increasing grooves extending radially and being spaced apart in the circumferential direction in separate marginal portions of said sealing element from said surface deformation-generating groove means.

18. A mechanical seal structure for use at high pressures, high temperatures, and high speeds, comprising:
 a rotating sealing element and a stationary sealing element being mounted to form a sliding sealing surface therebetween, and
 a plurality of groove means formed in at least one of said sealing elements adjacent to but not in contact with said sealing surface, said groove means generating surface deformations in said sealing surface with thermal expansion to form a film of cooling fluid in said sealing surface.

19. In a mechanical seal suitable to shaft sealing under the conditions of high pressure, high temperature and high speed, comprising:
 a shaft;
 a rotatable sealing element mounted on a shaft and rotated along with said shaft;
 a stationary sealing element forming a major annular sliding seal surface where sealing action is performed in cooperation with said rotatable sealing element;
 and a spring means provided in the axial direction to increase the surface pressure of said sliding seal surface,
 the improvement comprising,
 a plurality of surface deformation generating grooves for generating slight surface deformation on the peripheral portion of the sliding seal surface with thermal expansion to thereby provide a cooling fluid film, said grooves extending radially between a peripheral side portion, which does not contact with and is in the proximity of the sliding seal surface of the rotatable sealing element, at the side of the sliding seal surface and the peripheral end of the annular surface thereof, and said grooves being provided spaced apart in the circumferential direction,
 said rotatable sealing element being of an annular member having an annular surface larger than the outer peripheral portion of said sliding seal surface formed by said stationary sealing element.

20. A mechanical seal as set forth in claim 19, wherein the surface deformation generating groove is arcuate in cross section vertical to the shaft.

21. A mechanical seal as set forth in claim 19, wherein the surface deformation generating groove is square in cross section vertical to the shaft.

22. A mechanical seal as set forth in claim 19, wherein the surface deformation generating groove is U-shaped in cross section vertical to the shaft.

23. A mechanical seal as set forth in claim 19, comprising a protective ring connected to the outer peripheral face of a rotatable sealing element provided with surface deformation generating grooves.

* * * * *